(12) United States Patent
Lau et al.

(10) Patent No.: US 11,371,855 B2
(45) Date of Patent: *Jun. 28, 2022

(54) DYNAMIC CUSTOMIZATION OF AN AUTONOMOUS VEHICLE EXPERIENCE

(71) Applicants: AT&T INTELLECTUAL PROPERTY I, L.P., Atlanta, GA (US); AT&T Mobility II LLC, Atlanta, GA (US)

(72) Inventors: Erie Lai Har Lau, Redmond, WA (US); Sangar Dowlatkhah, Alpharetta, GA (US)

(73) Assignees: AT&T INIELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/818,936

(22) Filed: Mar. 13, 2020

(65) Prior Publication Data
US 2020/0217681 A1 Jul. 9, 2020

Related U.S. Application Data

(63) Continuation of application No. 15/829,831, filed on Dec. 1, 2017, now Pat. No. 10,627,249.

(51) Int. Cl.
*G01C 21/34* (2006.01)
*G05D 1/02* (2020.01)
(Continued)

(52) U.S. Cl.
CPC ..... *G01C 21/3484* (2013.01); *G01C 21/3415* (2013.01); *G01C 21/3492* (2013.01);
(Continued)

(58) Field of Classification Search
CPC ............ G01C 21/3415; G01C 21/3484; G01C 21/3492; G05D 1/0276; G05D 2201/0213; H04L 67/12; H04L 67/34; H04L 67/306
See application file for complete search history.

(56) References Cited

U.S. PATENT DOCUMENTS 6,338,011 B1  1/2002  Furst et al.
6,813,636 B1 * 11/2004  Bean ................... H04M 3/5237
                                                           379/265.12
(Continued)

FOREIGN PATENT DOCUMENTS

DE      10224466 A1    12/2003
DE   102010042089 A1    4/2012
(Continued)

OTHER PUBLICATIONS

Office Action dated Aug. 15, 2019 for U.S. Appl. No. 15/829,831, 23 pages.
(Continued)

*Primary Examiner* — Calvin Cheung
(74) *Attorney, Agent, or Firm* — Amin, Turocy & Watson, LLP

(57) ABSTRACT

Dynamic customization of an autonomous vehicle experience is presented herein. A dynamic recommendation engine can comprise a subscriber interface component, a data component, and a configuration component. The subscriber interface component can receive, from a subscriber of an autonomous vehicle service, a request specifying a route of transport by an autonomous vehicle; and based on the request, the data component can obtain, via a network slice comprising a virtual network function of the autonomous vehicle service, profile information for the subscriber and route information for the route. Further, the configuration component can determine, via the network slice based on the
(Continued)

profile information and the route information, configuration data for the autonomous vehicle, and send, via the network slice, the configuration data directed to the autonomous vehicle to facilitate the transport by the autonomous vehicle.

20 Claims, 10 Drawing Sheets

(51) Int. Cl.
*H04L 67/306* (2022.01)
*H04L 67/00* (2022.01)
*H04L 67/12* (2022.01)

(52) U.S. Cl.
CPC ......... *G05D 1/0276* (2013.01); *H04L 67/306* (2013.01); *H04L 67/34* (2013.01); *G05D 2201/0213* (2013.01); *H04L 67/12* (2013.01)

(56) References Cited

U.S. PATENT DOCUMENTS

| | | |
|---|---|---|
| 8,467,961 B2 | 6/2013 | Obradovich et al. |
| 9,233,655 B2 | 1/2016 | Barrett |
| 9,358,926 B2 | 6/2016 | Lambert et al. |
| 9,910,438 B1 | 3/2018 | Arden et al. |
| 10,126,749 B2 | 11/2018 | Rander |
| 2005/0288827 A1 | 12/2005 | Watkins |
| 2010/0222939 A1* | 9/2010 | Namburu ............... B60R 16/037 701/1 |
| 2011/0196571 A1 | 8/2011 | Foladare et al. |
| 2013/0132887 A1 | 5/2013 | Amin et al. |
| 2014/0279707 A1 | 9/2014 | Joshua et al. |
| 2016/0034845 A1 | 2/2016 | Hiyama et al. |
| 2017/0072850 A1 | 3/2017 | Curtis et al. |
| 2017/0072883 A1 | 3/2017 | Rai |
| 2018/0137593 A1* | 5/2018 | Djuric .................... G06Q 50/30 |
| 2018/0218470 A1* | 8/2018 | Belwafa ................. G06Q 50/30 |
| 2018/0348763 A1 | 12/2018 | Jiang et al. |

FOREIGN PATENT DOCUMENTS

| | | |
|---|---|---|
| DE | 102012023110 A1 | 6/2014 |
| WO | 2016002837 A1 | 2/2016 |

OTHER PUBLICATIONS

Notice of Allowance dated Dec. 13, 2019 for U.S. Appl. No. 15/829,831, 17 pages.

* cited by examiner

DYNAMIC CUSTOMIZATION OF AN AUTONOMOUS VEHICLE EXPERIENCE

RELATED APPLICATION

The subject patent application is a continuation of, and claims priority to, U.S. patent application Ser. No. 15/829,831, filed Dec. 1, 2017, and entitled "DYNAMIC CUSTOMIZATION OF AN AUTONOMOUS VEHICLE EXPERIENCE," the entirety of which application is hereby incorporated by reference herein.

TECHNICAL FIELD

The subject disclosure generally relates to embodiments for dynamic customization of an autonomous vehicle experience.

BACKGROUND

Conventional autonomous vehicle technologies can facilitate driving a passenger to a location, without an autonomous vehicle being controlled by the passenger. Consequently, such technologies have had some drawbacks with respect to tailoring a driving experience of the passenger according to passenger preferences, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
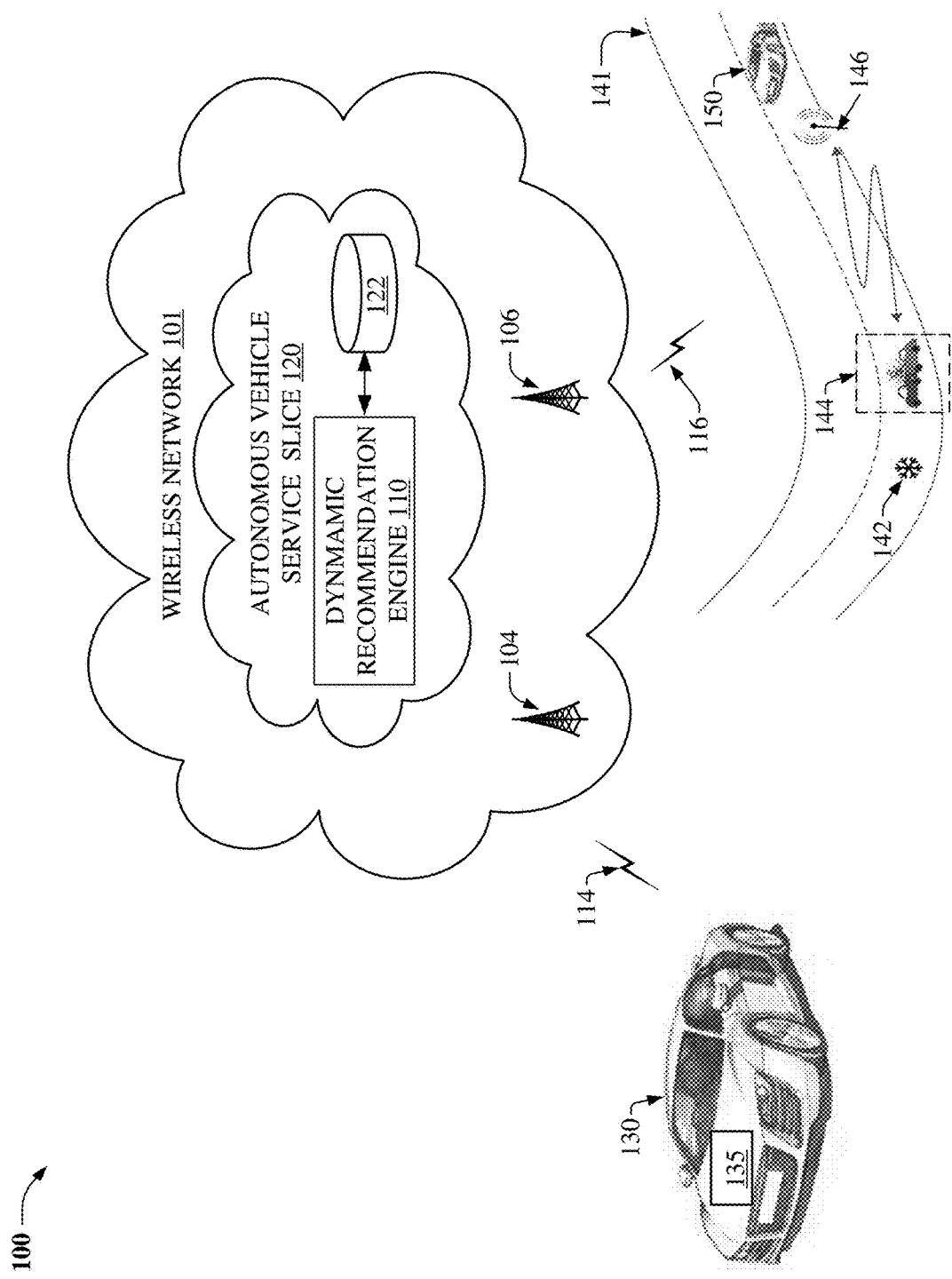
FIG. 1 illustrates a block diagram of an autonomous vehicle ecosystem comprising an autonomous vehicle service slice and a dynamic recommendation engine, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional vehicle technologies have had some drawbacks with respect to custom tailoring of a driving experience of a passenger of an autonomous vehicle according to preference(s) of the passenger. Various embodiments disclosed herein can improve passenger experience(s) by configuring, via a network slice associated with a virtual network function, an interior environment of an autonomous vehicle based on a profile of a passenger, a class of service that the passenger has subscribed to, and properties of a route that has been requested by the passenger.

For example, in an embodiment, a system, e.g., a dynamic recommendation engine, can comprise a subscriber interface component, a data component, and a configuration component. The subscriber interface component can receive, from a subscriber of an autonomous vehicle service, a request specifying a route of transport by an autonomous vehicle, e.g., operating without direct control by the subscriber; and based on the request, the data component can obtain, via a network slice comprising a virtual network function of the autonomous vehicle service, profile information for the subscriber and route information for the route. Further, the configuration component can determine, via the network slice based on the profile information and the route information, configuration data for the autonomous vehicle, and send, via the network slice, the configuration data directed to the autonomous vehicle to facilitate the transport by the autonomous vehicle.

In one embodiment, the network slice corresponds to a group of network slices comprising respective virtual software network functions of respective vehicle services comprising the autonomous vehicle service. In this regard, network slices of the group of network slices correspond to different control and user planes, e.g., to facilitate control of different autonomous vehicles according to the respective vehicle services. In another embodiment, in response to the request being received, the network slice can be instantiated in a memory of the system to provision the autonomous vehicle service via the autonomous vehicle.

In embodiment(s), the profile information can represent a selection of, e.g., a type of the autonomous vehicle (e.g., size, brand, model, etc. of a preferred autonomous vehicle); a class, preferred class, etc. of the autonomous service (e.g., luxury, sport, tourist, etc.); an interior configuration of the autonomous vehicle (e.g., a temperature of an interior of the autonomous vehicle, a seating configuration of the interior, an entertainment configuration (e.g., with respect to a preferred music genre, movie genre, sport/sports team, news service, etc. corresponding to sound, radio, video, etc. device(s) of the interior), etc.

In other embodiment(s), the profile information represents a preference of the subscriber corresponding to another route the subscriber has traveled on. In this regard, the other route can satisfy a defined condition with respect to being similar to the route with respect to, e.g., a distance of the route, a geographical location of the route, a purpose (e.g., as a commuter, a tourist, a business traveler, etc.) for the request, etc.

In yet other embodiment(s), the profile information represents a preference of a passenger/driver of a second vehicle, e.g., autonomous vehicle, non-autonomous vehicle, etc. that has traveled along the route, along another route that has been determined to be similar to the route with respect to, e.g., a geographic location of the route, a distance of the route, etc.

In an embodiment, the route information can represent traffic information for the route that has been obtained by the data component, e.g., from traffic information service(s), sensor device(s) that have been installed along the route, etc. In another embodiment, the route information can represent police and/or emergency responder, e.g., fire, tow truck, etc. activity along the route; construction activity along the route, weather condition(s) (e.g., precipitation, wind, etc.) corresponding to the route, etc.

In embodiment(s), the configuration data can specify a configuration of, e.g., a temperature of an interior of the autonomous vehicle, a seating configuration of the interior, a multimedia configuration of the interior, a direction of the autonomous vehicle, an acceleration of the autonomous vehicle, etc. In this regard, in an embodiment, based on the route information representing, e.g., high traffic occurring on the route, police and/or emergency responder activity occurring along the route, construction activity occurring along the route, etc., the configuration component can generate the configuration data to facilitate control of navigation device(s), acceleration device(s), braking device(s), steering device(s), etc. of the autonomous vehicle for transport of the subscriber to a destination of the route along a detour of the route, e.g., the detour determined, by the data component, to be associated with less traffic, police and/or emergency responder, construction, etc. activity than such activities corresponding to the route.

In one embodiment, a method can comprise instantiating, by a system comprising a processor, a network slice of an autonomous vehicle service as a virtual network function to facilitate a transport, via an autonomous vehicle, of a subscriber, e.g., identified by a subscriber identity of the autonomous vehicle service, according to a route that has been specified by a request associated with the subscriber identity—in response to receiving, by the system, the request associated with the subscriber identity. Further, in response to a profile of the subscriber identity and route information of the route being obtained by the system using the network slice, the system can determine, based on the profile and the route information using the network slice, configuration data, and send, using the network slice, the configuration data directed to the autonomous vehicle to facilitate the transport of the subscriber.

In embodiment(s), the instantiating comprises instantiating the network slice using a control plane—the control plane being different from another control plane corresponding to an instantiation, as another virtual network function, of another network slice, e.g., corresponding to another autonomous vehicle service.

In other embodiment(s), obtaining the profile of the subscriber identity comprises obtaining information presenting an environmental preference for an interior of the vehicle, a seating configuration for the interior, an entertainment configuration for the interior, a preference of a passenger/driver of another vehicle corresponding to the route, etc.

In an embodiment, the determining of the route information can comprise determining a traffic condition of the route. In turn, the determining of the configuration data can comprise determining, based on the traffic condition, a detour for the route.

In another embodiment, a machine-readable storage medium can comprise executable instructions that, when executed by a processor, facilitate performance of operations, comprising: receiving, from a subscriber of a vehicle service, a request for transportation, via an autonomous vehicle, to a destination; based on the request, obtaining, via a network slice comprising a virtual network function, a subscriber profile of the subscriber and route information of a route corresponding to the destination; and based on the subscriber profile and the route information, generating, via the network slice, configuration data for the autonomous vehicle, and sending, via the network slice, the configuration data directed to the autonomous vehicle to facilitate the transportation to the destination.

In one embodiment, the virtual network function corresponds to a first control plane that is different than a second control plane corresponding to another virtual network function, e.g., corresponding to another vehicle service. In another embodiment, the generating the configuration data comprises generating detour information to facilitate the transportation to the destination via a detour.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As mentioned above, conventional vehicle technologies have had some drawbacks with respect to tailoring a transportation experience of a passenger of an autonomous vehicle according to preference(s) of the passenger. To address these and other concerns of such technologies, various embodiments disclosed herein can improve passenger experience(s) by configuring, via a network slice associated with a virtual network function, an autonomous vehicle based on: a profile of a passenger of the autonomous vehicle, a class of service that the passenger has subscribed to, and properties of a route that has been requested by the passenger.

Figure 2:
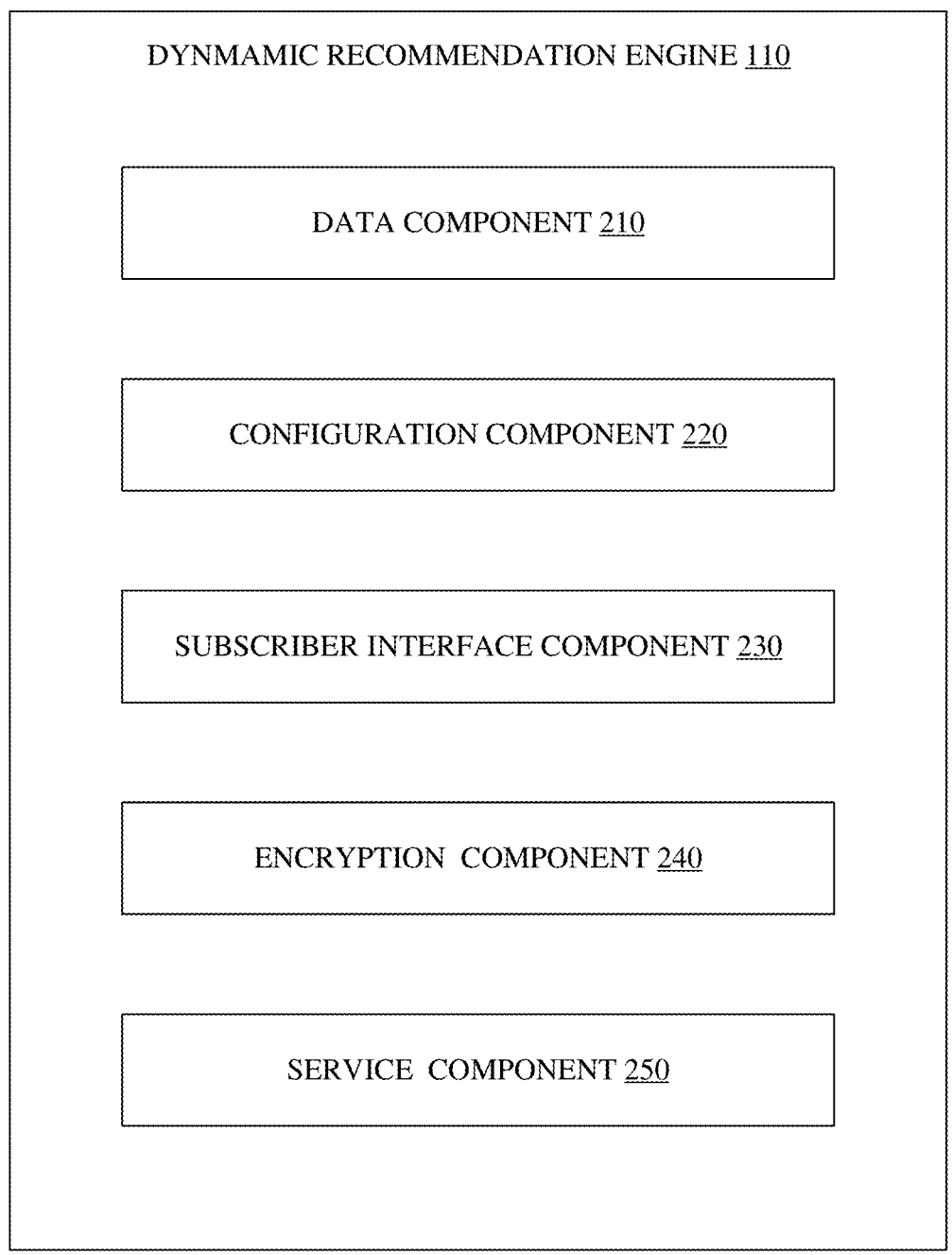
FIG. 2 illustrates a block diagram of a dynamic recommendation engine, in accordance with various example embodiments.

In this regard, and now referring to FIGS. 1 and 2, block diagrams of an autonomous vehicle ecosystem (100)—comprising an autonomous vehicle service slice (120) of an autonomous vehicle service—and a dynamic recommendation engine (110) are illustrated, respectively, in accordance with various example embodiments. Autonomous vehicle ecosystem 100 can comprise an autonomous vehicle (e.g., 130, 150) that is wirelessly connected, via a wireless network 101, to dynamic recommendation engine 110 of autonomous vehicle service slice 120—autonomous vehicle service slice 120 comprising a virtual network function of the autonomous vehicle service.

Dynamic recommendation engine 110 can comprise data component 210, configuration component 220, and subscriber interface component 230. In this regard, subscriber interface component 230 can receive, from a subscriber of the autonomous vehicle service, a request specifying a route (141) of transport by the autonomous vehicle. Further, based on the request, data component 210 can obtain, via autonomous vehicle service slice 120, profile information for the subscriber and route information for the route. In an embodiment, data component 210 can store/retrieve the profile information from data store 122.

In turn, configuration component 220 can determine, via autonomous vehicle service slice 120 based on the profile information and the route information, configuration data for the autonomous vehicle, and send, via autonomous vehicle service slice 120, the configuration data directed to the autonomous vehicle to facilitate the transport by the autonomous vehicle.

In an embodiment, autonomous vehicle service slice 120 can correspond to a group of network slices (not shown) comprising respective virtual software network functions of respective vehicle services comprising the autonomous vehicle service. In this regard, network slices of the group of network slices can correspond to different control and user planes, e.g., to facilitate control of different autonomous vehicles according to the respective vehicle services. In one embodiment, in response to the request being received, autonomous vehicle service slice 120 can be instantiated in a memory of autonomous vehicle ecosystem 100 to provision the autonomous vehicle service via the autonomous vehicle.

In other embodiment(s), as illustrated by FIG. 1, data component 210 can wirelessly communicate, via wireless network 101, with the autonomous vehicle, other vehicles (e.g. a non-autonomous vehicle, an autonomous vehicle), sensors installed along the route (e.g., 142, 144), etc. via a wireless interface (e.g., 114, 116) utilizing an access point (AP) (e.g. 104, 106, 146), e.g., a macro AP, a Femto AP, a pico AP, a base station, etc. The wireless interface can comprise an over-the-air wireless link comprising a downlink (DL) and an uplink (UL) (both not shown) that can utilize a predetermined band of radio frequency (RF) spectrum associated with, e.g., cellular, LTE, LTE advanced (LTE-A), GSM, 3GPP universal mobile telecommunication system (UMTS), Institute of Electrical and Electronics Engineers (IEEE) 802.XX technology (WiFi, Bluetooth, etc.), worldwide interoperability for microwave access (WiMax), a wireless local area network (WLAN), Femto, near field communication (NFC), Wibree, Zigbee, satellite, WiFi Direct, etc. Accordingly, wireless network 101 can be associated with RF spectrums corresponding to respective types of wireless technologies including, but not limited to, cellular, WiFi, WiMax, WLAN, Femto, NFC, Wibree, Zigbee, satellite, WiFi Direct, etc.

In yet other embodiment(s), dynamic recommendation engine 110 can be communicatively coupled, via autonomous vehicle service slice 120, to wireless network 101 utilizing one or more of the Internet (or another communication network (e.g., an Internet protocol (IP) based network)), a digital subscriber line (DSL)-type or broadband network facilitated by Ethernet or other technology, and/or wireless interface(s), e.g., cellular, WiFi, WiMax, WLAN, Femto, NFC, Wibree, Zigbee, satellite, WiFi Direct, etc. In this regard, components, portions, etc. of autonomous vehicle ecosystem 100 can comprise a cloud-based, centralized, communication platform, Internet platform, WAN, etc. In turn, component(s), portion(s), etc. of autonomous vehicle service slice 120, e.g., dynamic recommendation engine 110, can be implemented within the cloud-based, centralized, communication platform.

In embodiment(s), the profile information for the subscriber can represent a selection of, e.g., a type of the autonomous vehicle (e.g., size, brand, model, etc. of a preferred autonomous vehicle); a class, preferred class, etc. of the autonomous vehicle service (e.g., luxury, sport, tourist, etc.); an interior configuration of the autonomous vehicle (e.g., a temperature of an interior of the autonomous vehicle, a seating configuration of the interior, an entertainment configuration (e.g., with respect to a preferred music genre, movie genre, sport/sports team, news service, etc. corresponding to sound, radio, video, etc. device(s) of the interior), etc.

In this regard, in one embodiment, data component 210 can be configured to determine the profile information based on subscriber information received, via subscriber interface component 230, from the subscriber. In another embodiment, data component 210 can be configured to determine the profile information based on a wireless profile of the subscriber, e.g., representing multimedia content, e.g., music downloads, music streaming, video content, news, videos, etc. that the subscriber has accessed, e.g., via a provider of a wireless communication service, from the Internet utilizing a wireless device, cellular phone, smart watch, etc.

In other embodiment(s), the profile information can represent a preference of the subscriber corresponding to another route (not shown) that the subscriber has traveled on. In this regard, the other route can be selected, e.g. by data component 210, in response to a determination that the other route satisfies a defined condition with respect to being similar to the route, e.g., with respect to a distance of the route, a geographical location of the route, a purpose of transportation, e.g., obtained by subscriber interface component 230, of the subscriber (e.g., representing whether the subscriber is a commuter, a tourist, a business traveler, etc. for the route), etc.

In yet other embodiment(s), the profile information can represent a preference of a passenger/driver of a second vehicle, e.g., another autonomous vehicle, a non-autonomous vehicle, etc. that has traveled along the route, along another route that has been determined to be similar to the route with respect to, e.g., a geographic location of the route, a distance of the route, elevation of the route, etc.

In an embodiment, the route information can represent traffic information for the route that has been obtained by the data component, e.g., from traffic information service(s), sensor device(s), e.g., camera(s) that have been installed along the route, etc. In another embodiment, the route information can represent police and/or emergency responder, e.g., fire, tow truck, etc. activity (144) along the route; construction activity along the route, weather condition(s) (142) (e.g., precipitation, wind, etc.) corresponding to the route, etc.

In embodiment(s), the configuration data can specify a configuration of, e.g., a temperature of an interior of the autonomous vehicle; a seating configuration of the interior; a multimedia configuration of the interior, e.g., representing a music stream, movie stream, sport/sports team audio/video stream, news service stream, etc. to be presented to the subscriber via multimedia devices (see e.g., vehicle devices 325 below) of the autonomous vehicle; a navigation system of the autonomous vehicle; an acceleration, braking, and steering system of the autonomous vehicle, e.g., to facilitate control of travel of the autonomous vehicle, e.g., along the route, along a detour of the route, etc.

In this regard, in an embodiment, based on the route information representing, e.g., high traffic occurring on the route, police and/or emergency responder activity occurring on the route, construction activity occurring on the route, etc., configuration component 220 can generate the configuration data to facilitate control of the navigation system, control of the acceleration, braking, and steering system, etc. of the autonomous vehicle, e.g., to facilitate transport of the subscriber to the destination along the detour.

In another embodiment, based on the profile information representing a selection of a type of the autonomous vehicle (e.g., size, brand, model, etc.), configuration component 220 can select, via an inventory of autonomous vehicles (not shown) that has been maintained by a provider of the autonomous vehicle service, a "best selection" of autonomous vehicle from the inventory to facilitate the transport of the subscriber by the best selection of the autonomous vehicle. In this regard, the best selection can represent a selection, from the inventory, of an autonomous vehicle, e.g., satisfying a majority of parameters, e.g., size, brand, model, availability, etc. of an autonomous vehicle that have been represented by the profile information; satisfying a key parameter, e.g., availability, size, etc. of the autonomous vehicle that has been represented by the profile information, etc.

In yet another embodiment, encryption component 240 can encrypt the configuration data according to manufacturing specification(s) for a specific brand, type, etc. of the autonomous vehicle to generate encrypted data, and send the encrypted data directed to the autonomous vehicle to facilitate the transport by the autonomous vehicle.

In another embodiment, service component 250 can configure the autonomous vehicle service based on tiered service and pricing. For example, service component 250 can facilitate a selection, by the subscriber, of a class of autonomous vehicle service of a group of classes of autonomous vehicle service, e.g., comprising a luxury class, a tourist class, a sport class, etc. based on respective prices of the classes of autonomous vehicle service. In this regard, service component 250 can facilitate billing the subscriber for a class of autonomous vehicle service that the subscriber has selected according to a price of the respective prices corresponding to the class of autonomous vehicle service.

Figure 3:
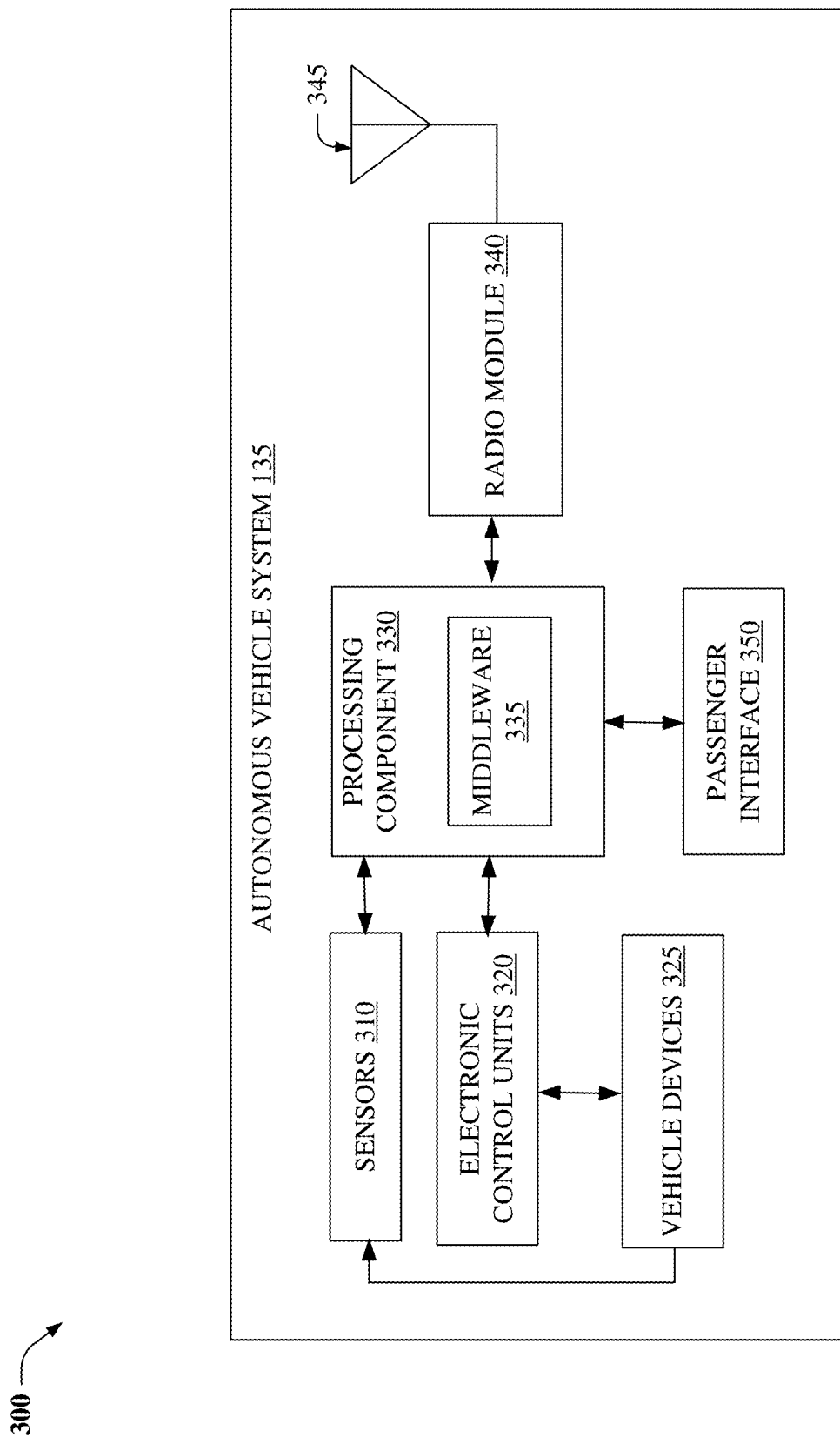
FIG. 3 illustrates a block diagram of an autonomous vehicle system, in accordance with various example embodiments.

Now referring to FIG. 3, a block diagram (300) of a vehicle system (135) comprising sensors (310), electronic control units (320), vehicle devices (325), a processing component (330) comprising middleware (335), passenger interface (350), radio module (340), and antenna(s) (345) is illustrated, in accordance with various embodiments. In this regard, middleware 335 comprises computer-readable media for storing instructions that can be executed by processing component 330 for performing various operations of the autonomous vehicle (e.g., 130, 150).

In embodiment(s), the operations can comprise receiving, via a wireless interface (e.g., 114, 116) using radio module 340 and antenna(s) 345, the configuration data from dynamic recommendation engine 110, and controlling, based on the configuration data, vehicle devices 325, e.g., climate control devices, seating devices, suspension devices, steering devices, acceleration devices, braking devices, navigation devices, warning devices, entertainment, e.g., multimedia, devices, etc. of the autonomous vehicle.

In embodiment(s), radio module 340 can comprise a long-term evolution (LTE) based radio module corresponding to new radio access technology, e.g., operable from sub-gigahertz (GHz), e.g., 1 GHz, to 100 GHz. In other embodiment(s), middleware 335 can comprise OEM firmware for configuring, controlling, etc. electronic control units 320 corresponding to respective devices of vehicle devices 325.

In other embodiment(s), passenger interface 350 can be used to receive an override input from the passenger enabling the passenger to override one or more autonomous features controlled by the configuration data. In this regard, based on the override input, middleware 335 can enable the passenger to adjust, control, modify, etc. the configuration data to facilitate control, by the passenger, of vehicle devices 325.

FIGS. 4-8 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
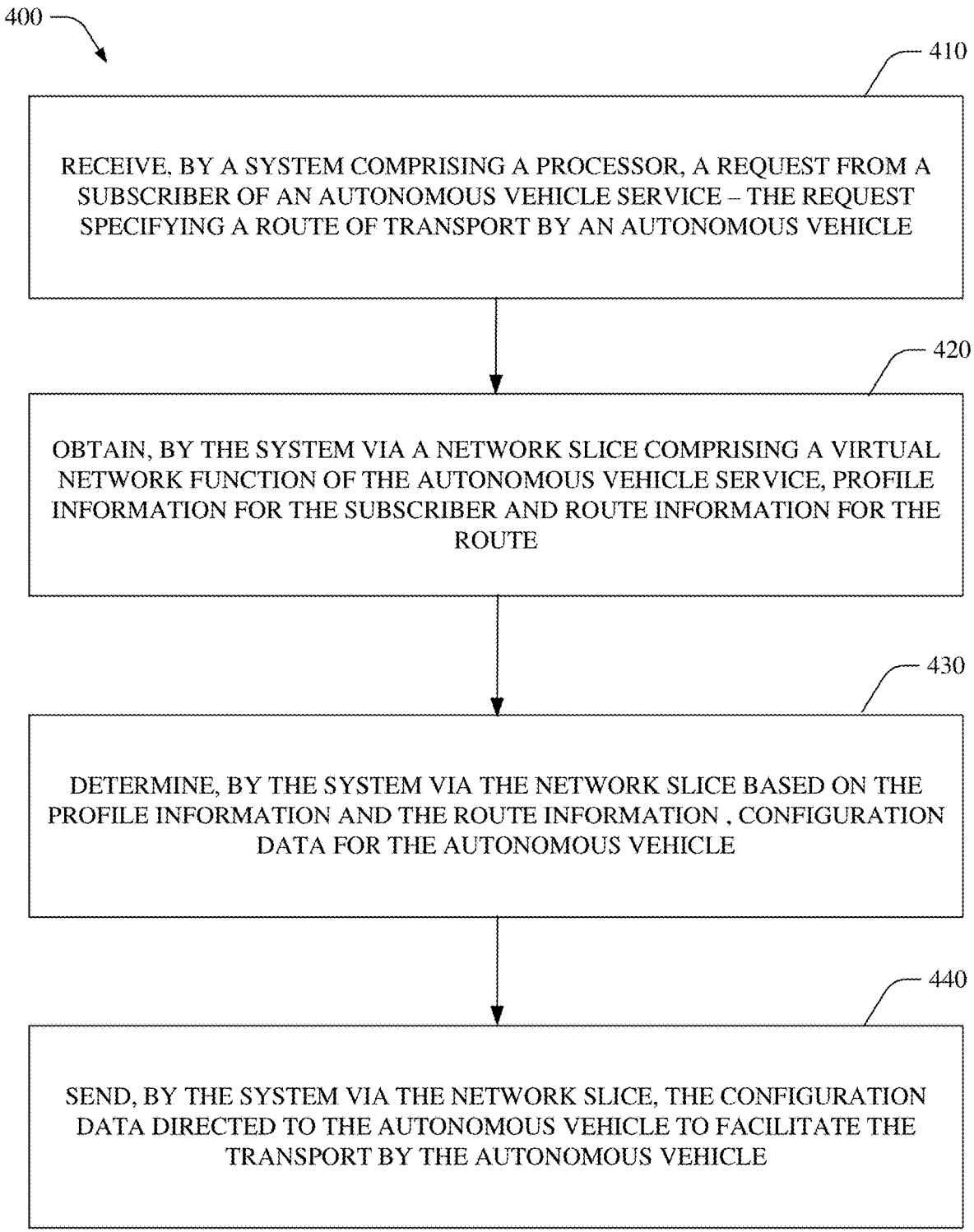
FIGS. 4-8 illustrate flowcharts of methods associated with a dynamic recommendation engine, in accordance with various example embodiments.

Referring now to FIG. 4, a process (400) performed by a system, e.g., dynamic recommendation engine 110, is illustrated, in accordance with various example embodiments. At 410, the system can receive a request from a subscriber of an autonomous vehicle service—the request specifying a route of transport by an autonomous vehicle. At 420, the system can obtain, via a network slice comprising a virtual network function of the autonomous vehicle service, profile information for the subscriber and route information for the route. At 430, the system can determine, via the network slice based on the profile information and the route information, configuration data for the autonomous vehicle. At 440, the system can send, via the network slice, the configuration data directed to the autonomous vehicle to facilitate the transport by the autonomous vehicle.

Figure 5:
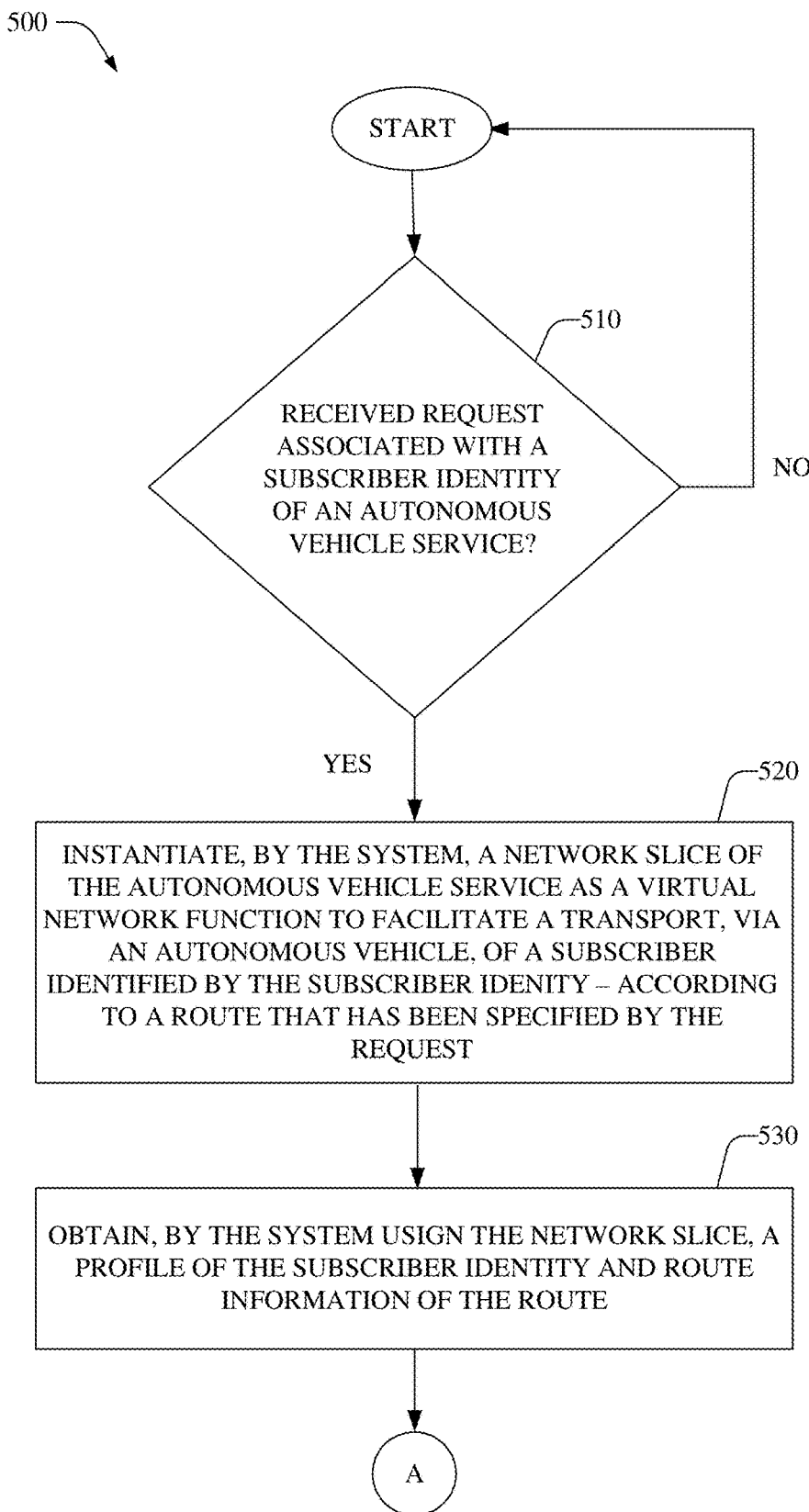
Figure 6:
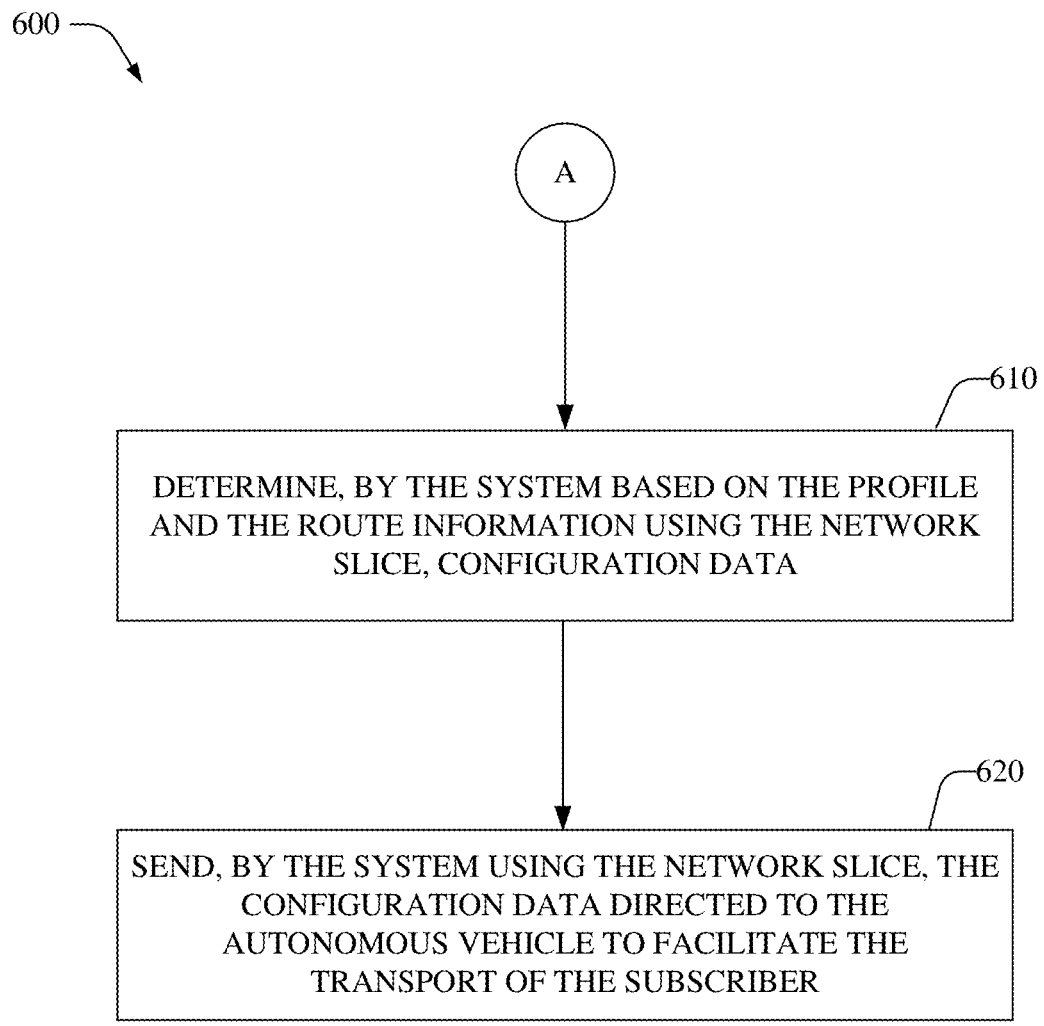

FIGS. 5 and 6 illustrate another process (500 and 600) performed by the system, e.g., dynamic recommendation engine 110, in accordance with various embodiments. At 510, it can be determined whether a request associated with a subscriber identity of an autonomous vehicle service has been received. In this regard, in response to a determination that the request has been received, flow continues to 520, at which the system can instantiate a network slice of the autonomous vehicle service as a virtual function to facilitate a transport, via an autonomous vehicle, of a subscriber identified by the subscriber identity according to a route that has been specified by the request. At 530, the system can obtain, using the network slice, a profile of the subscriber identity and route information of the route. Flow continues from 530 to 610, at which the system can determine, based on the profile and the route information using the network slice, configuration data. At 610, the system can send, using the network slice, the configuration data directed to the autonomous vehicle to facilitate the transport of the subscriber.

Figure 7:
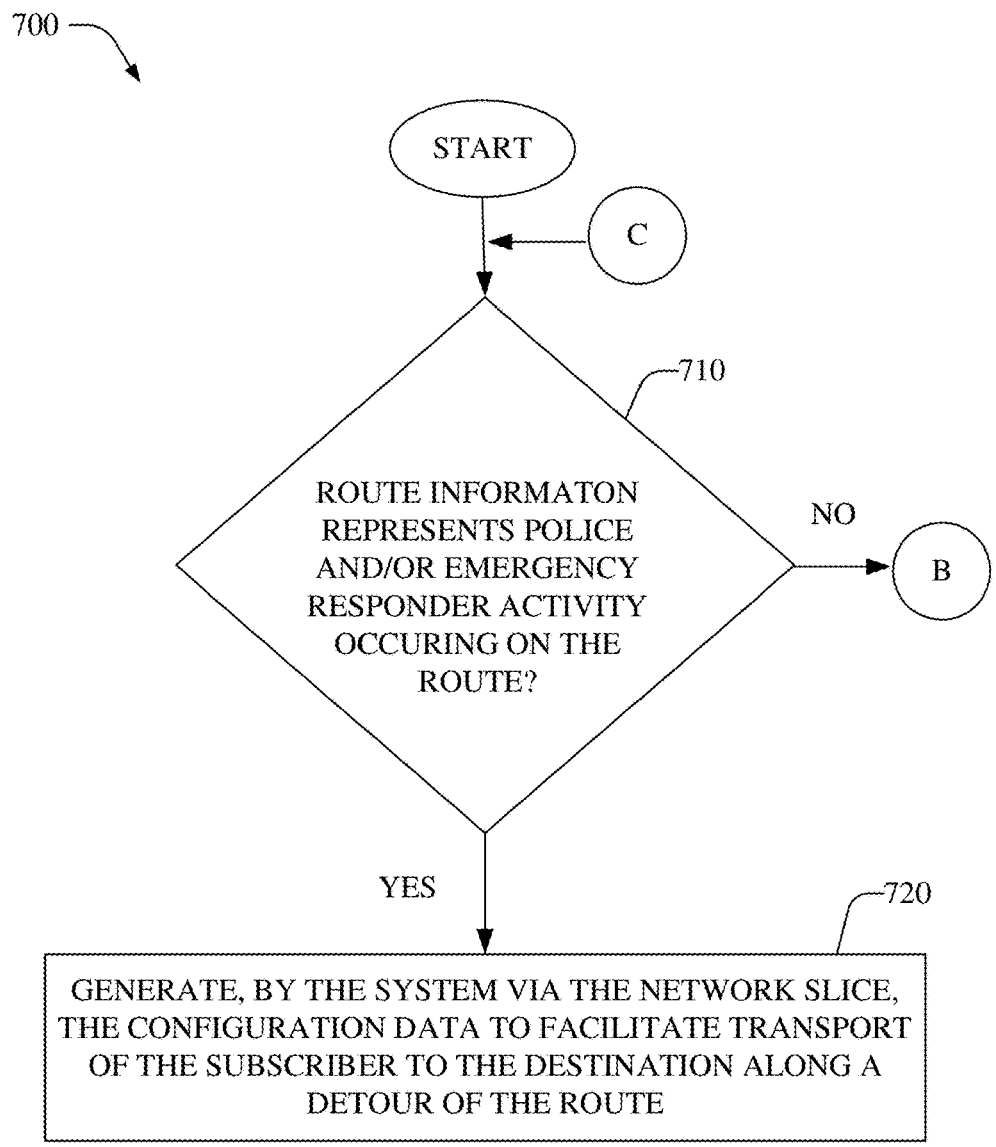
Figure 8:
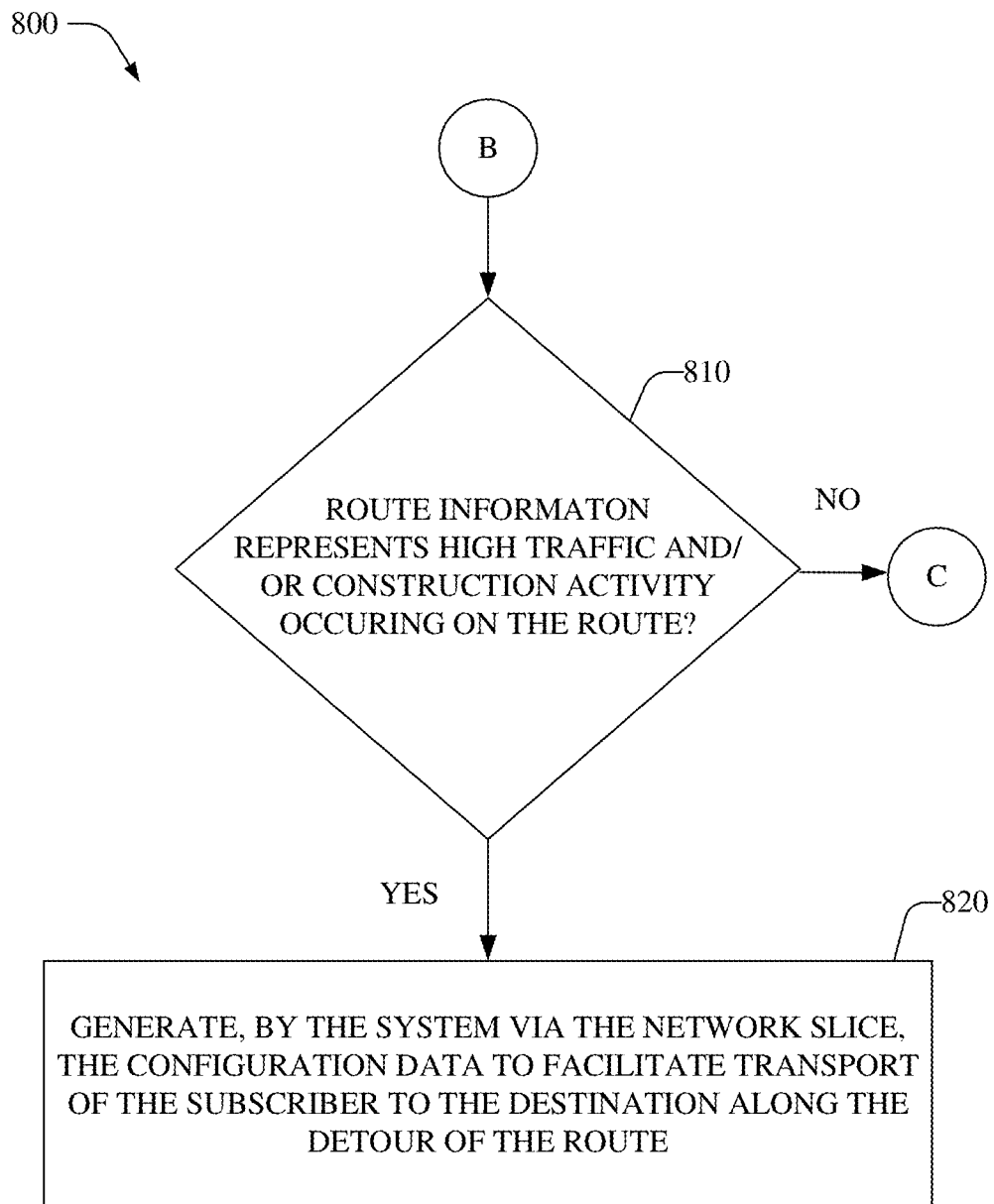

FIGS. 7-8 illustrate a process (700 and 800) performed by the system, e.g., dynamic recommendation engine 110, to facilitate transport of the subscriber to a destination along a detour of a route corresponding to the destination, in accordance with various embodiments. In this regard, at 710, it can be determined whether route information represents police, e.g., radar, and/or emergency responder activity occurring on the route. In this regard, in response to a determination that the route information represents police and/or emergency responder activity occurring on the route, flow continues to 720, at which the system can generate, via the network slice, the configuration data to facilitate transport of the subscriber to the destination along the detour of the route; otherwise flow continues to 810.

At 810, it can be determined whether the route information represents high traffic, e.g., with respect to representing a defined level of delay, e.g., more than 10 minutes, above an average commute time corresponding to the route, and/or construction activity occurring on the route. In this regard, in response to a determination that the route information represents high traffic and/or construction activity occurring on the route, flow continues to 820, at which the system can generate, via the network slice, the configuration data to facilitate transport of the subscriber to the destination along the detour of the route; otherwise flow returns to 710.

Figure 9:
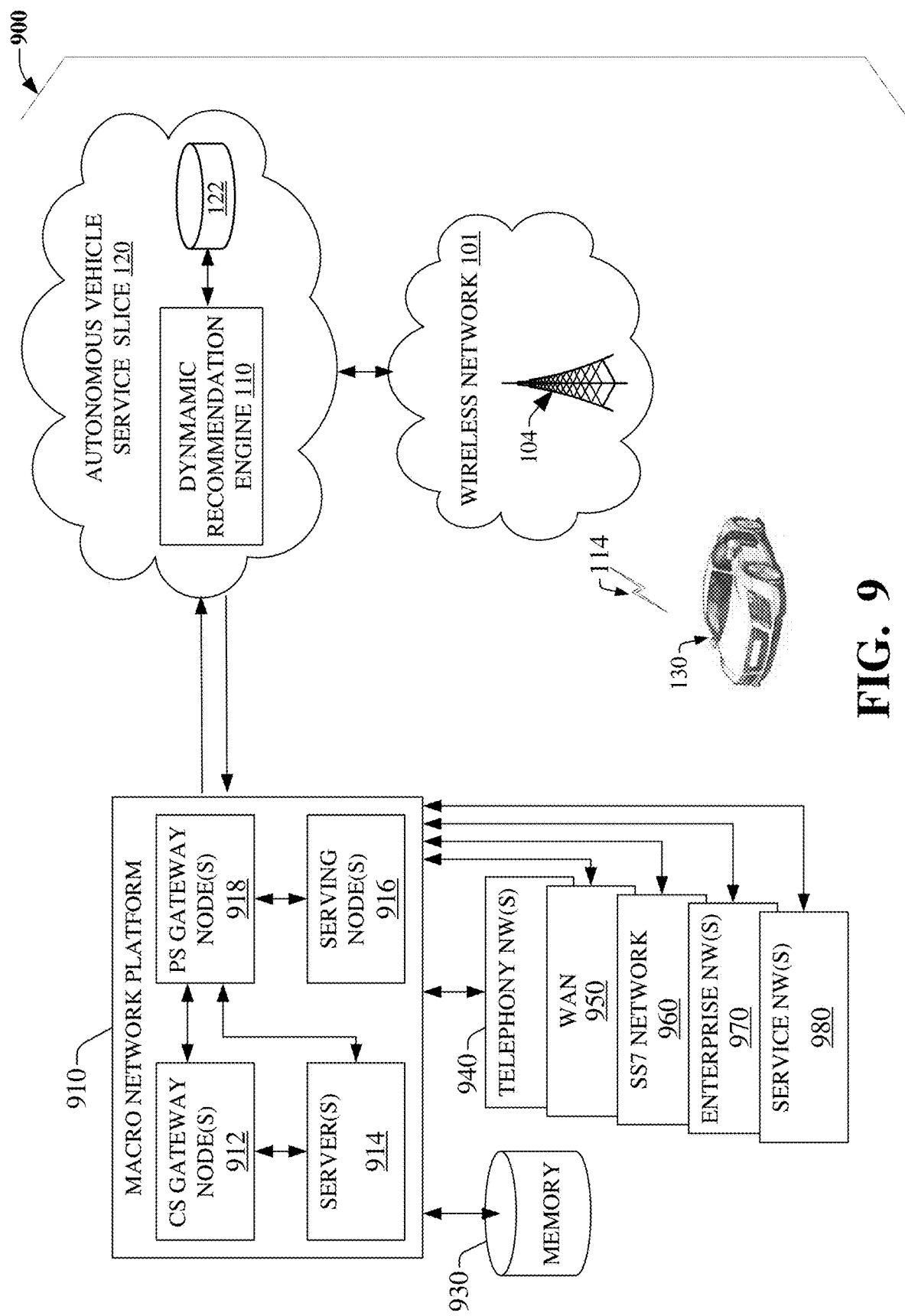
FIG. 9 illustrates a block diagram of a wireless network environment, in accordance various example embodiments.

With respect to FIG. 9, a wireless communication environment 900 including macro network platform 910 is illustrated, in accordance with various embodiments. Macro network platform 910 serves or facilitates communication with a vehicle system (e.g., 135) of an autonomous vehicle (e.g., 130, 150) and autonomous vehicle service slice 120 via wireless network 101. It should be appreciated that in cellular wireless technologies, e.g., 3GPP UMTS, high speed packet access (HSPA), 3GPP LTE, third generation partnership project 2 (3GPP2), ultra-mobile broadband (UMB), LTE-A, etc. that can be associated with wireless network 101, macro network platform 910 can be embodied in a core network. It is noted that wireless network 101 can include base station(s) (e.g., 104, 106), base transceiver station(s), access point(s), etc. and associated electronic circuitry and deployment site(s), in addition to a wireless radio link (e.g., 114, 116) operated in accordance with the base station(s), etc. Accordingly, wireless network 101 can comprise various coverage cells, or wireless coverage areas. In addition, it should be appreciated that elements and/or components (e.g., dynamic recommendation engine 110, data store 122) of autonomous vehicle service slice 120 can be located/included within one or more components/elements, e.g., hardware, software, etc., of wireless communication environment 900, e.g., macro network platform 910, wireless network 101, etc.

Generally, macro network platform 910 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication, e.g., via dynamic recommendation engine 110. In various embodiments, macro network platform 910 includes CS gateway (GW) node(s) 912 that can interface CS traffic received from legacy networks like telephony network(s) 940, e.g., public switched telephone network (PSTN), public land mobile network (PLMN), Signaling System No. 7 (SS7) network 960, etc. CS GW node(s) 912 can authorize and authenticate traffic, e.g., voice, arising from such networks. Additionally, CS GW node(s) 912 can access mobility or roaming data generated through SS7 network 960; for instance, mobility data stored in a visitor location register (VLR), which can reside in memory 930. Moreover, CS GW node(s) 912 interfaces CS-based traffic and signaling with PS GW node(s) 918. As an example, in a 3GPP UMTS network, PS GW node(s) 918 can be embodied in GW general packet radio service (GPRS) support node(s) (GGSN).

As illustrated by FIG. 9, PS GW node(s) 918 can receive and process CS-switched traffic and signaling via CS GW node(s) 912. Further PS GW node(s) 918 can authorize and authenticate PS-based data sessions, e.g., via wireless network 101, with served devices, communication devices, etc. Such data sessions can include traffic exchange with networks external to macro network platform 910, like wide area network(s) (WANs) 950; enterprise networks (NWs) 970, e.g., E911, service NW(s) 980, e.g., an IP multimedia subsystem (IMS), etc. It should be appreciated that local area network(s) (LANs), which may be a part of enterprise NW(s) 970, can also be interfaced with macro network platform 910 through PS GW node(s) 918. PS GW node(s) 918 can generate packet data contexts when a data session is established, e.g., associated with an EPS bearer context activation. To that end, in an aspect, PS GW node(s) 918 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), PS GW node(s) 918 (e.g., GGSN) and tunnel interface (e.g., TTG) comprise a packet data GW (PDG).

Macro network platform 910 also includes serving node(s) 916 that can convey the various packetized flows of information, or data streams, received through PS GW node(s) 918. As an example, in a 3GPP UMTS network, serving node(s) can be embodied in serving GPRS support node(s) (SGSN).

As indicated above, server(s) 914 in macro network platform 910 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 910. Data streams can be conveyed to PS GW node(s) 918 for authorization/authentication and initiation of a data session, and to serving node(s) 916 for communication thereafter. Server(s) 914 can also effect security, e.g., implement one or more firewalls, of macro network platform 910 to ensure network's operation and data integrity in addition to authorization and authentication procedures that CS GW node(s) 912 and PS GW node(s) 918 can enact. Moreover, server(s) 914 can provision services from external network(s), e.g., WAN 950, or global positioning system (GPS) network(s), which can be a part of enterprise NW(s) 980. It is to be noted that server(s) 914 can include one or more processors configured to confer at least in part the functionality of macro network platform 910. To that end, the one or more processors can execute code instructions stored in memory 930, for example.

In wireless communication environment 900, memory 930 can store information related to operation of macro network platform 910, e.g., related to operation of an autonomous vehicle (e.g., 130, 150), dynamic recommendation engine 110, etc. The information can include data, business data, etc. associated with subscribers of respective services; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via wireless network 101; and so forth. Memory 930 can also store information from at least one of telephony network(s) 940, WAN 950, SS7 network 960, enterprise NW(s) 970, or service NW(s) 980.

In one or more embodiments, components of core network environment 900 can provide, e.g., via autonomous vehicle service slice 120, communication services to the autonomous vehicle utilizing an over-the-air wireless link (e.g., 114, 116) via wireless network 101. In this regard, wireless network 101 can include one or more: macro, Femto, or pico access points (APs) (not shown); base stations (BS) (not shown); landline networks (e.g., optical landline networks, electrical landline networks) (not shown) communicatively coupled between the autonomous vehicle and macro network platform 910, etc.

Core network environment 900 can include one or more of the Internet (or another communication network (e.g., IP-based network)), or DSL-type or broadband network facilitated by Ethernet or other technology. In various embodiments, core network environment 900 can include hardware and/or software for allocating resources to the autonomous vehicle and dynamic recommendation engine 110, converting or enforcing protocols, establishing and/or providing levels of quality of service (QoS), providing applications or services, translating signals, and/or performing other desired functions to facilitate system interoperability and communication to/from the autonomous vehicle and dynamic recommendation engine 110.

In other embodiment(s), core network environment 900 can include data store component(s), a memory configured to store information, computer-readable storage media storing computer-executable instructions, e.g., memory 930, etc. enabling various operations performed via dynamic recommendation engine as described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "middleware," "memory storage," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in data store 122, middleware 335, memory 930, non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1020 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
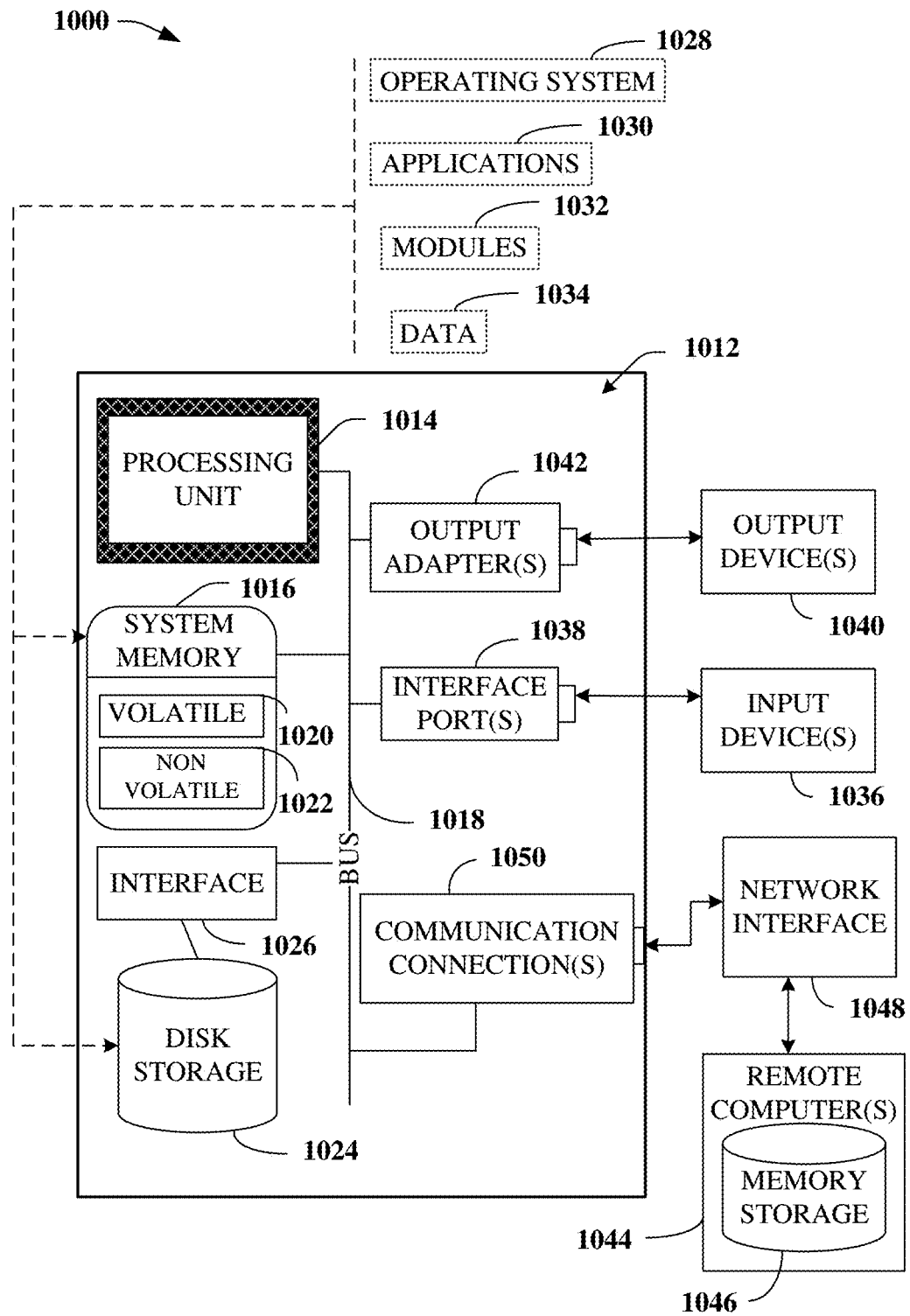
FIG. 10 is a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 include, for example, a serial port, a parallel port, a game port, a universal serial bus (USB), a wireless based port, e.g., WiFi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 include, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device (e.g., 1046) is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit-switching networks like integrated services digital networks (e.g., ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc.; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), $x^{th}$ generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., UE, and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to an autonomous vehicle ecosystem comprising an autonomous vehicle service slice and dynamic recommendation engine, (see e.g., 100), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless system e.g., a wireless communication device, vehicle system 135, etc. for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, via policy rules of a policy framework, etc. as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module, component, etc. Thus, the classifier(s) can be used by an artificial intelligence system to automatically learn and perform a number of functions, e.g., performed by a system (e.g., dynamic recommendation engine 110), including but not limited to: in response to receiving, from a subscriber of an autonomous vehicle service, a request specifying a route of transport by an autonomous vehicle, obtaining, via a network slice comprising a virtual network function of the autonomous vehicle service, profile information for the subscriber and route information for the route; and in response to determining, via the network slice based on the profile information and the route information, configuration data for the autonomous vehicle, sending, via the network slice, the configuration data directed to the autonomous vehicle to facilitate the transport by the autonomous vehicle.

A classifier can be a function that maps an input attribute vector, $x=(x1, x2, x3, x4, xn)$, to a confidence that the input belongs to a class, that is, $f(x)=\text{confidence (class)}$. Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   in response to receiving a request, associated with a subscriber of an autonomous vehicle service, corresponding to transport by an autonomous vehicle, obtaining, via a network slice comprising a virtual network function of the autonomous vehicle service, profile information representing a selection of an interior configuration of the autonomous vehicle with respect to an entertainment configuration of an interior of the autonomous vehicle for the subscriber of the autonomous vehicle service, wherein the network slice has been instantiated in a memory device of the system to facilitate provisioning of the autonomous vehicle service via the autonomous vehicle, and wherein the entertainment configuration of the interior of the autonomous vehicle comprises at least one of a temperature configuration of the interior of the autonomous vehicle, a seating configuration of the interior of the autonomous vehicle, or a multimedia configuration of the interior of the autonomous vehicle; and based on the entertainment configuration, autonomously controlling, via the network slice, respective devices of the interior of the autonomous vehicle.

2. The system of claim 1, wherein the selection is a first selection, and wherein the profile information represents a second selection of a type of the autonomous vehicle.

3. The system of claim 1, wherein the selection is a first selection, and wherein the profile information represents a second selection of a class of the autonomous vehicle service.

4. The system of claim 1, wherein the profile information represents the selection of the interior configuration of the autonomous vehicle with respect to at least one of the temperature of the interior of the autonomous vehicle or the seating configuration of the interior of the autonomous vehicle.

5. The system of claim 1, wherein the profile information represents a preference of the subscriber corresponding to a route of the transport by the autonomous vehicle.

6. The system of claim 1, wherein the subscriber is a first occupant, wherein the autonomous vehicle is a first vehicle, and wherein the operations further comprise:

deriving the profile information based on occupant information representing a preference of a second occupant of a second vehicle associated with a route of the transport by the autonomous vehicle.

7. The system of claim 1, wherein the operations further comprise:

obtaining, via the network slice, route information comprising traffic information for a route of the transport by the autonomous vehicle.

8. The system of claim 1, wherein the configuration data specifies a configuration for at least one of the temperature of the interior of the autonomous vehicle, the seating configuration of the interior of the autonomous vehicle, a multimedia configuration of the interior of the autonomous vehicle, or a direction of the autonomous vehicle.

9. The system of claim 1, wherein the virtual network function corresponds to a group of software network functions of respective vehicle services comprising the autonomous vehicle service.

10. The system of claim 9, wherein the network slice is a first network slice, wherein the virtual network function is a first virtual network function of the group of software network functions, wherein the autonomous vehicle service is a first service of the respective vehicle services, and wherein the first network slice corresponds to first control and user planes that are distinct from second control and user planes corresponding to a second network slice that is associated with a second virtual network function of the group of software network functions that is associated with a second service of the respective vehicle services.

11. The system of claim 1, wherein the operations further comprise:

in response to the receiving the request, instantiating the network slice in the memory to provision the autonomous vehicle service.

12. A method, comprising:

in response to receiving a request associated with a transport of a subscriber, identified by a subscriber identity, of an autonomous vehicle service, instantiating, by a system comprising a processor, a network slice of the autonomous vehicle service as a virtual network function to facilitate the transport, via an autonomous vehicle, of the subscriber; and in response to obtaining, by the system using the network slice, a profile that is associated with the subscriber identity and that represents a selection of an entertainment configuration of the autonomous vehicle comprising a seating configuration of an interior of the autonomous vehicle, determining, based on the profile using the network slice, configuration data, and autonomously controlling, based on the configuration data via the network slice using a device of the autonomous vehicle, the seating configuration of the interior of the autonomous vehicle.

13. The method of claim 12, wherein the autonomous vehicle service is a first service, wherein the network slice is a first network slice, wherein the virtual network function is a first virtual network function, and wherein the instantiating comprises:

instantiating the first network slice using a first control plane, wherein a second network slice has been instantiated as a second virtual network function using a second control plane that is different from the first control plane.

14. The method of claim 12, wherein the obtaining the profile associated with the subscriber identity comprises obtaining information presenting an environmental preference for the interior of the vehicle.

15. The method of claim 12, wherein the subscriber is a first occupant, wherein the autonomous vehicle is a first vehicle, and wherein the obtaining the profile associated with the first occupant comprises determining a preference associated with a second occupant of a second vehicle corresponding to a route that is associated with the transport of the subscriber.

16. The method of claim 12, further comprising:

determining, by the system, a traffic condition of a route that is associated with the transport of the subscriber.

17. The method of claim 12, further comprising:

determining, by the system, a detour for a route that is associated with the transport of the subscriber.

18. A non-transitory machine-readable medium, comprising executable instructions that, when executed by a processor, facilitate performance of operations, comprising:

receiving, from a subscriber device associated with a subscription to a vehicle service, a request for transportation, via an autonomous vehicle, to a destination;

based on the request, obtaining, via a network slice comprising a virtual network function, a subscriber profile of the subscription, the subscriber profile representing a selection of an interior configuration of the autonomous vehicle with respect to an entertainment configuration of the interior, the entertainment configuration comprising a multimedia configuration of the interior of the vehicle; and based on the subscriber profile, generating, via the network slice, configuration data for the autonomous vehicle to facilitate modification of the multimedia configuration of the interior of the vehicle, and autonomously controlling, based on the configuration data via a device of the vehicle, the multimedia configuration of the interior of the vehicle.

19. The non-transitory machine-readable medium of claim 18, wherein the virtual network function is a first virtual function, and wherein the first virtual function corresponds to a first control plane that is different than a second control plane corresponding to a second virtual function.

20. The non-transitory machine-readable medium of claim 18, wherein the generating the configuration data comprises generating detour information to facilitate the transportation to the destination via a detour.

\* \* \* \* \*